(12) United States Patent
Hisada

(10) Patent No.: US 6,535,300 B2
(45) Date of Patent: *Mar. 18, 2003

(54) PICTURE SIGNAL PROCESSING APPARATUS AND METHOD

(75) Inventor: Hidenori Hisada, Tokonane (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,610

(22) Filed: Jun. 24, 1998

(65) Prior Publication Data

US 2001/0048531 A1 Dec. 6, 2001

(30) Foreign Application Priority Data

Jun. 26, 1997 (JP) .............................................. 9-169840

(51) Int. Cl.⁷ .................................................. H04N 1/04
(52) U.S. Cl. ........................ 358/1.4; 358/479; 709/253; 348/260
(58) Field of Search ................................ 358/479, 468, 358/1.4, 450, 446, 253, 443, 558, 445, 448, 449; 348/446, 443, 558, 445, 448, 449, 441, 260, 229, 230; 709/253, 250

(56) References Cited

U.S. PATENT DOCUMENTS

| | | | | | |
|---|---|---|---|---|---|
| 5,237,317 A | * | 8/1993 | Hara | .......................... | 340/798 |
| 5,457,494 A | * | 10/1995 | Suga et al. | .................. | 348/229 |
| 5,479,607 A | * | 12/1995 | Tasaki et al. | ................ | 395/166 |
| 5,850,264 A | * | 12/1998 | Agarwal | ...................... | 348/469 |
| 5,896,178 A | * | 4/1999 | Inoue | .......................... | 348/453 |
| 5,987,215 A | * | 11/1999 | Kato et al. | ................... | 386/112 |
| 5,990,863 A | * | 11/1999 | Sakamoto | .................... | 345/147 |
| 6,041,361 A | * | 3/2000 | Wilson et al. | .............. | 709/253 |

* cited by examiner

Primary Examiner—Thomas D. Lee
(74) Attorney, Agent, or Firm—Oliff & Berridge, PLC

(57) ABSTRACT

A picture signal processing apparatus and method is presented that determines whether there is an odd or even-number field signal in the picture signals received, by referring to flags that are turned on or off in accordance with the result of odd and even-number field detection. If the odd and even-number field flags are on, an image processing operation A is performed. If the odd-number field flag is on and the even-number field is off, an image processing operation B is performed. If the odd-number field flag is off and the even-number field is on, an image processing operation C is performed. In accordance with whether there is an odd or even-number field signal in the received picture signals, an appropriate image processing operation is selected from the different operations. That is, the received picture signals are processed in a mode suitable to the signals, so as to generate suitable image data. By automatically switching the picture signal conversion mode to an appropriate mode in accordance with the picture signals received, the apparatus and method eliminate the need for a user to perform a troublesome switching operation.

22 Claims, 8 Drawing Sheets

PICTURE SIGNAL PROCESSING APPARATUS AND METHOD

BACKGROUND OF THE INVENTION

1. Field of Invention

The invention relates to a picture signal processing apparatus and method for converting picture signals input from a video camera, or the like, and, more particularly, to a picture signal processing apparatus and method capable of switching the picture signal converting mode to an appropriate mode in accordance with the picture signals received.

2. Description of Related Art

Multifunction computer peripheral apparatuses have been developed which are equipped with many functions, such as a facsimile function, a printer function, a scanner function, a copier function, and the like. Some multifunction peripheral apparatuses are further equipped with a video printer function for printing an image based on picture signals input from a video camera, a video deck, or the like.

The picture signals output from video cameras and the like, fall into two types: standard video signals, including odd and even number field signals, and non-standard video signals, including either odd-number field signals or even-number field signals, but not both. If the signals input to a peripheral apparatus, as described above, are standard video signals, the apparatus, after receiving odd and even-number field signals separately, combines the field signals by non-interlace processing, converts the signals into image data, and prints the image data. If the signals input are non-standard video signals, the apparatus, after receiving odd or even-number field signals, performs linear complementary processing on the odd or even-number field signals received, converts the signals into image data, and prints the image data.

Normally, standard video signals are output from a video camera, a video deck, or the like, for reproduction, and non-standard video signals are output from a video deck, or the like, for still-picture reproduction or from a computer game machine, and the like. The multifunction peripheral apparatus as described above, has a manual change switch for changing between different modes for converting the received picture signals. Depending on the state of the change switch, the apparatus switches the picture signal converting mode between interlace and linear complementary processing. Therefore, the apparatus requires a user to perform a troublesome operation, i.e., operating the manual change switch in accordance with whether the video signals to be input to the multifunction peripheral apparatus are standard video signals or non-standard video signals. Furthermore, it is rather difficult for a normal user to determine whether the video signals to be input are of standard or non-standard type. Therefore, the conventional multifunction peripheral apparatuses are not easy to use.

SUMMARY OF THE INVENTION

Accordingly, one aspect of the invention is to provide a picture signal processing apparatus and a picture signal processing method which eliminate the need for a user to perform a switching operation, by automatically switching the mode of converting received picture signals into an appropriate mode, in accordance with the picture signals.

According to this aspect of the invention, there is provided a picture signal processing apparatus including a reception device for receiving a picture signal, a conversion device for converting the picture signal received by the reception device into image data, an odd-number field determining device for determining whether there is an odd-number field signal in the picture signal received by the reception device, an even-number field determining device for determining whether there is an even-number field signal in the picture signal received by the reception device, and a conversion mode changing device for changing a mode of conversion into image data by the conversion device, on the basis of the determinations made by the odd-number field and the even-number field determining devices.

The conversion mode changing device may set the mode of conversion from the picture signal into image data for non-interlace processing, if it is determined that there are both the odd-number field signal and the even-number field signal in the picture signal, by the odd-number field and the even-number field determining devices.

The conversion mode changing device may also set the mode of conversion from the picture signal into image data for linear complementary processing, if it is determined that there is one of the odd-number field signal and the even-number field signal in the picture signal, by the odd-number field and the even-number field determining devices.

The picture signal processing apparatus may further include an indication device for indicating that there is neither the odd-number field signal nor the even-number field signal in the picture signal, if it is determined so by the odd-number field and the even-number field determining devices.

The picture signal processing apparatus may further include a printing device for printing an image based on the image data obtained through the conversion by the conversion device, and a print preventing device for preventing the printing device from printing, if it is determined that there is neither the odd-number field signal nor the even-number field signal in the picture signal, by the odd-number field and the even-number field determining devices. In addition, the picture signal received by the reception device may be a video signal.

Furthermore, if it is determined by the odd-number field and the even-number field determining devices that there is one of the odd-number field signal and the even-number field signal in the picture signal, the conversion mode changing device selects a linear complementary processing mode in a case where there is the odd-number field signal, but not the even-number field signal, and selects the linear complementary processing mode in the case where there is the even-number field signal but not the odd-number field signal.

According to another aspect of the invention, there is provided a picture signal processing apparatus including a receiver unit that receives a picture signal, a converter unit that converts the picture signal received by the receiver unit into image data, an odd-number field determining unit that determines whether there is an odd-number field signal in the picture signal received by the receiver unit, an even-number field determining unit that determines whether there is an even-number field signal in the picture signal received by the receiver unit, and a conversion mode changer unit that changes a mode of conversion into image data by the converter unit, on the basis of the determination made by the odd-number field and the even-number field determining units.

The conversion mode changer unit may set the mode of conversion from the picture signal into image data for non-interlace processing, if it is determined that there are both the odd-number field signal and the even-number field signal in the picture signal, by the odd-number field and the even-number field determining units.

The conversion mode changer unit may set the mode of conversion from the picture signal into image data for linear complementary processing, if it is determined that there is one of the odd-number field signal and the even-number field signal in the picture signal, by the odd-number field and the even-number field determining units.

The picture signal processing apparatus may further include an indicator unit that indicates that there is neither the odd-number field signal nor the even-number field signal in the picture signal, if it is determined so by the odd-number field and the even-number field determining units.

The picture signal processing apparatus may further include a printer unit that prints an image based on the image data obtained through the conversion by the converter unit, and a print preventing unit that prevents the printer unit from printing, if it is determined that there is neither the odd-number field signal nor the even-number field signal in the picture signal, by the odd-number field and the even-number field determining units.

The picture signal received by the receiver unit may be a video signal. Furthermore, the printer unit may be an ink jet printer.

The picture signal processing apparatus may further include an odd-number field memory that stores the odd-number field signal in the picture signal received by the receiver unit, and an even-number field memory that stores the even-number field signal in the picture signal received by the receiver unit. The picture signal processing apparatus may further include a frame memory that stores the image data obtained through conversion by the converter unit.

According to still another aspect of the invention, there is provided a picture signal processing method that includes receiving a picture signal, of converting the picture signal received in the receiving step into image data, determining whether there is an odd-number field signal in the picture signal received in the receiving step, determining whether there is an even-number field signal in the picture signal received by the receiving step, changing the image data conversion mode into, based on the determinations made in the odd-number field and the even-number field determining step.

The apparatus and method of the invention concern switching the mode of converting picture signals into image data in accordance with the picture signal received, thereby eliminating the need for a user to perform a troublesome switching operation to switch the signal conversion mode.

If picture signals received include odd-number field signals and even-number field signals, the picture signals can be converted into image data by non-interlace processing. If picture signals received include either odd-number field signals or even-number field signals but not both, the picture signals can be converted into image data by linear complementary processing. Therefore, received picture signals of any of the aforementioned types can be converted into suitable image data.

If there are neither odd-number field signals nor even-number field signals in the picture signals, the indication device advises a user that neither of the signals have been received. This situation (i.e., neither odd-number field signals nor even-number field signals are received) may occur when the picture signal output apparatus is not connected to the picture signal processing apparatus, or when the outputting apparatus has an abnormality, or the like. Therefore, this structure provides a simple indication of such a failure to the user.

Furthermore, since the picture signals received are converted into image data in a processing mode suitable to the picture signals, it is possible to achieve a good-quality print regardless of what type of picture signals are received. In addition, if neither odd-number field signals nor even-number field signals are included in picture signals received, printing based on the picture signals is prevented, so that an unnecessary or useless printing operation will not be performed.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
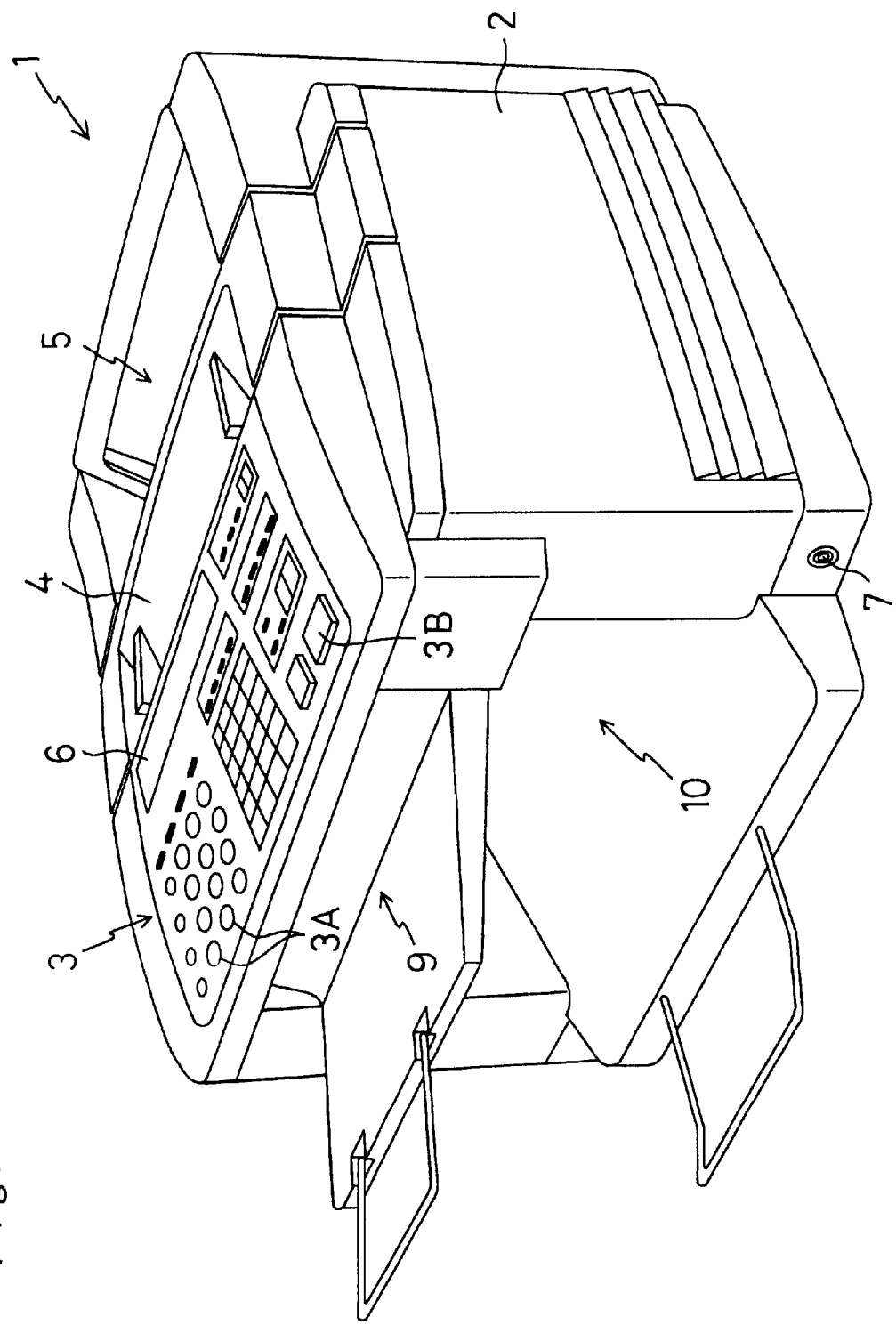
FIG. 1 is a perspective view of a multifunction peripheral apparatus equipped with a picture signal processing apparatus according to a preferred embodiment of the invention.

A preferred embodiment of the invention will be described in detail hereinafter with reference to the accompanying drawings. FIG. 1 is a perspective view of a multifunction peripheral apparatus 1 equipped with a picture signal processing apparatus according to a preferred embodiment of the invention. The multifunction peripheral apparatus 1 has a video printer function and various other functions, in addition to a facsimile function, a printer function, a scanner function and a copier function.

Referring to FIG. 1, a main body 2 of the multifunction peripheral apparatus 1 has a box-like shape. An operating panel 3 is disposed in a forward portion of an upper surface of the main body 2. Arranged in the operating panel 3 are various buttons including "0"–"9" number buttons 3A, a start button 3B, and other buttons. By depressing suitable buttons in the operating panel 3, various operations are performed. A liquid crystal display (LCD) 6 is provided rearward of the operating panel 3, for displaying various settings of the multifunction peripheral apparatus 1, various operation messages, and the like, when necessary.

Provided rearward of the LCD 6 is a document loading portion 4 for placing a stack of facsimile documents to be transmitted to an external facsimile apparatus 51 (see FIG. 2) during a facsimile function mode, or a stack of copy documents to be copied during a copy function mode. A document is conveyed from the document loading portion 4 into an interior of the apparatus main body 2, where an image is scanned from the document. After the image is scanned, the document is further conveyed and discharged onto a document discharge portion 9 that is provided below the operating panel 3 in such a manner that a plurality of documents discharged can be stacked.

A cassette insert opening 5 is formed rearward of the document loading portion 4. Although not shown, a sheet cassette capable of holding a stack of recording sheets is detachably set into the cassette insert opening 5. A recording sheet is fed from the sheet cassette set in the cassette insert opening 5, and then subjected to printing by an ink jet printer 26 described below, and finally discharged from a recording sheet discharge portion 10 provided below the document discharge portion 9. A video signal input terminal 7 is provided downward right, and close to the recording sheet discharge portion 10. When a video camera or the like is connected to the video signal input terminal 7, video signals from the video camera are sent into an interior of the multifunction peripheral apparatus 1, where the signals are converted into image data. Based on the image data, a full color print is produced by the full-color ink jet printer 26.

Figure 2:
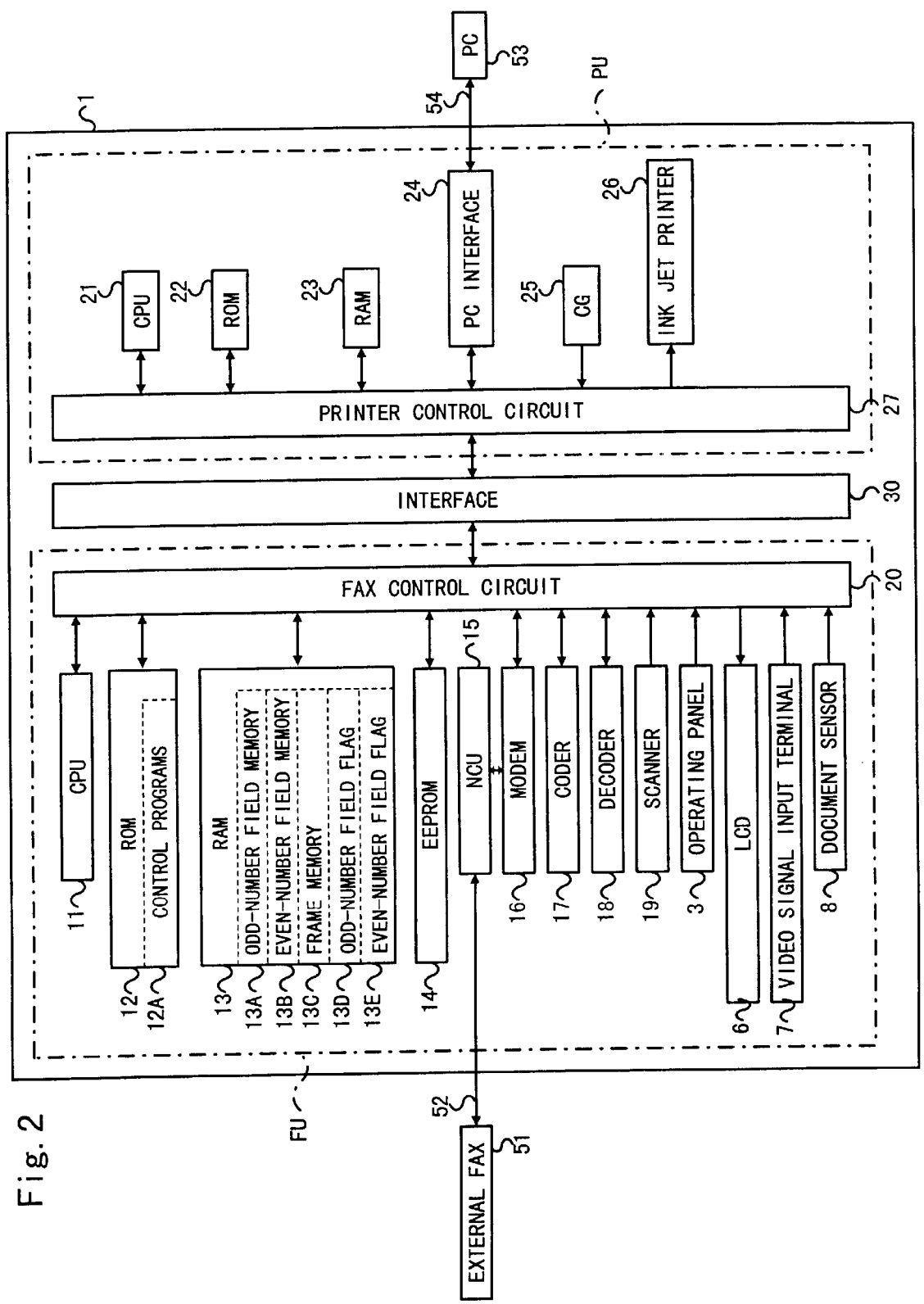
FIG. 2 is a block diagram of an electrical construction of the multifunction peripheral apparatus shown in FIG. 1.

FIG. 2 is a block diagram of the multifunction peripheral apparatus 1. The multifunction peripheral apparatus 1 is made up of a facsimile unit FU and a printer unit PU that are interconnected by an interface 30. The facsimile unit FU includes a CPU 11, a ROM 12, a RAM 13, an EEPROM 14, a network control unit (hereinafter, referred to as "NCU") 15, a modem 16, a coder 17, a decoder 18, a scanner 19, the operating panel 3, the LCD 6, the video signal input terminal 7, and a document sensor 8. These components are interconnected by a facsimile control circuit 20.

Figure 3:
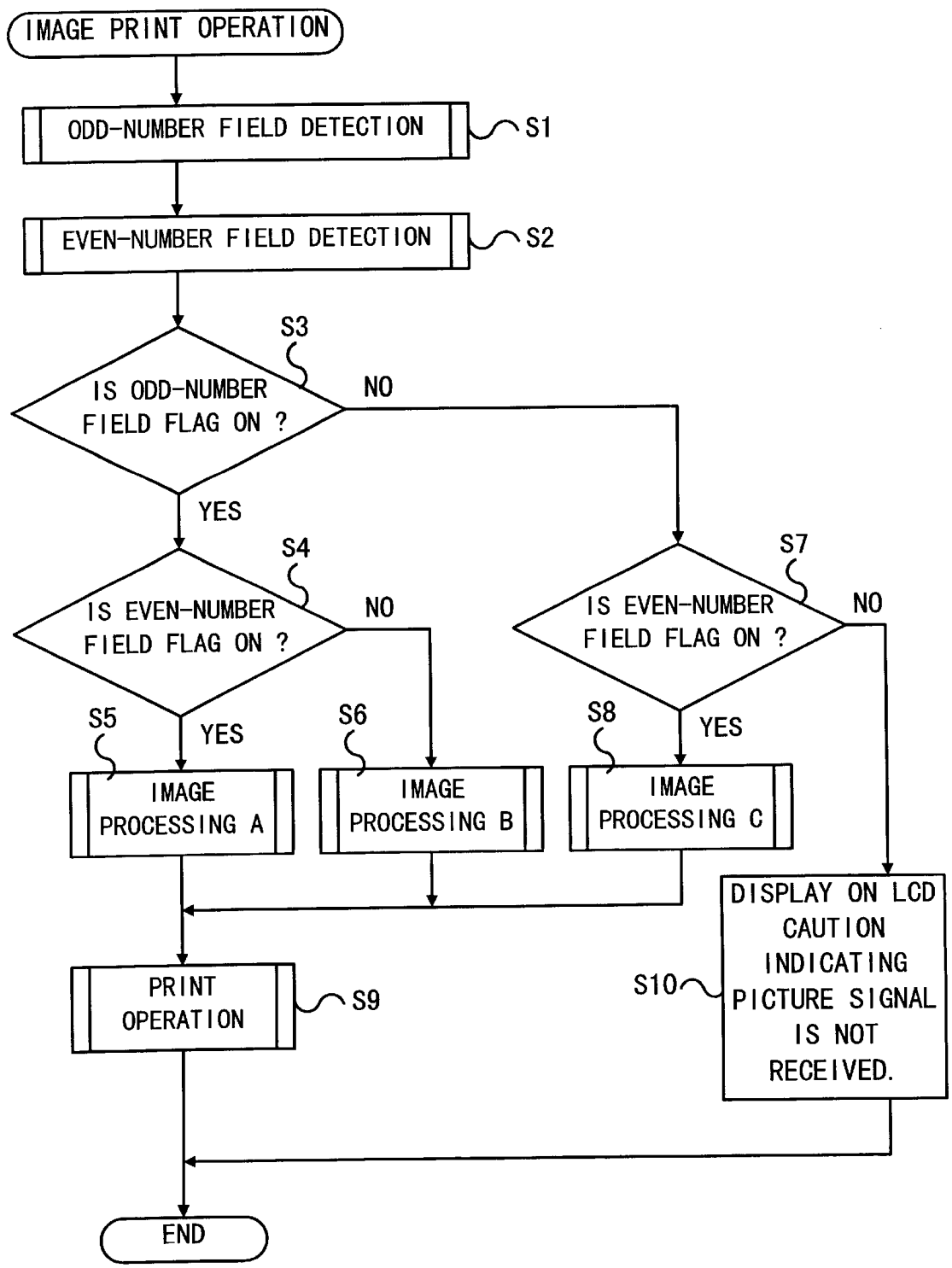
FIG. 3 is a flowchart of an image printing operation performed by a facsimile unit of the multifunction peripheral apparatus.
Figure 4:
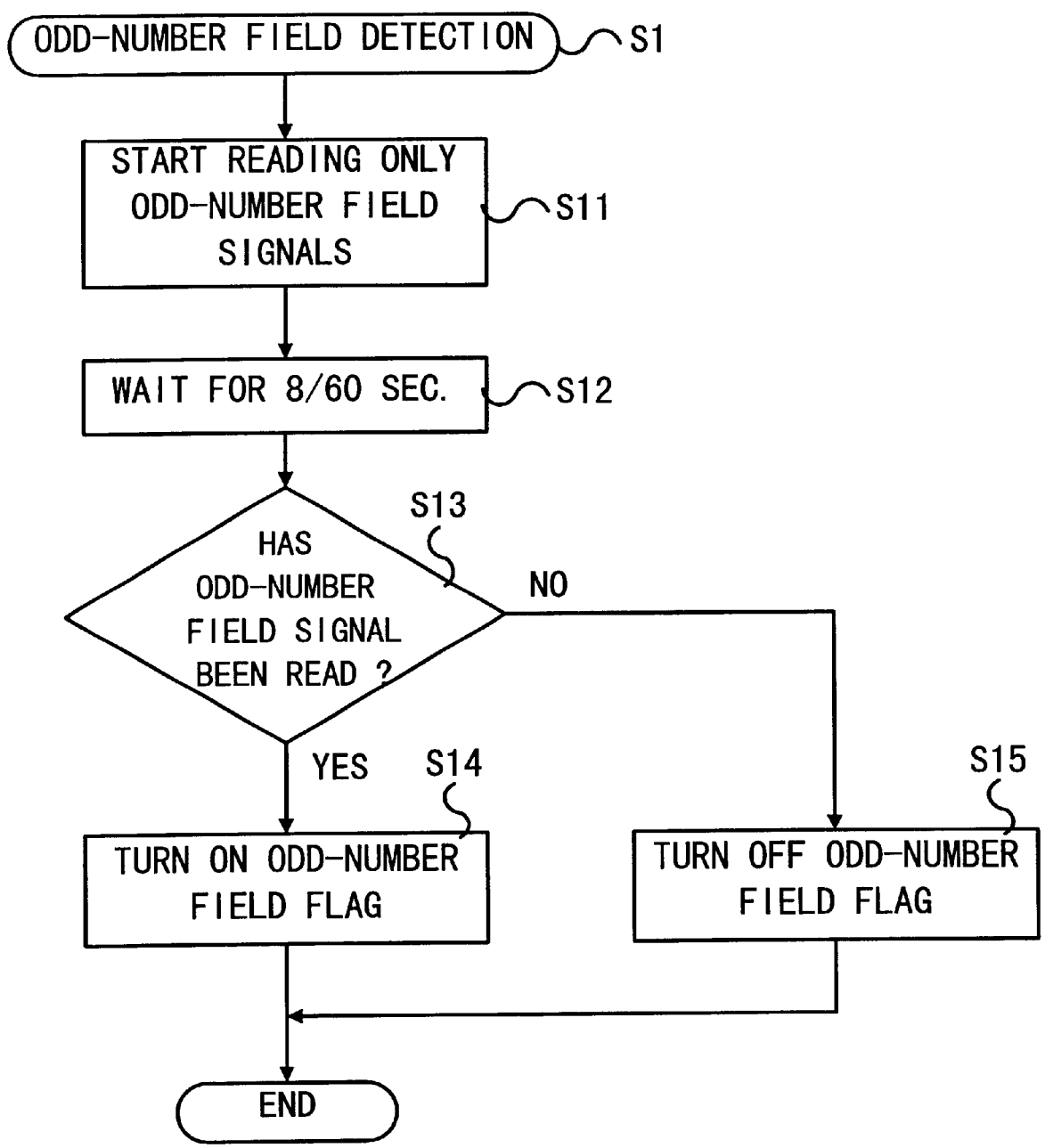
FIG. 4 is a flowchart of an odd-number field detecting operation performed by the facsimile unit.
Figure 5:
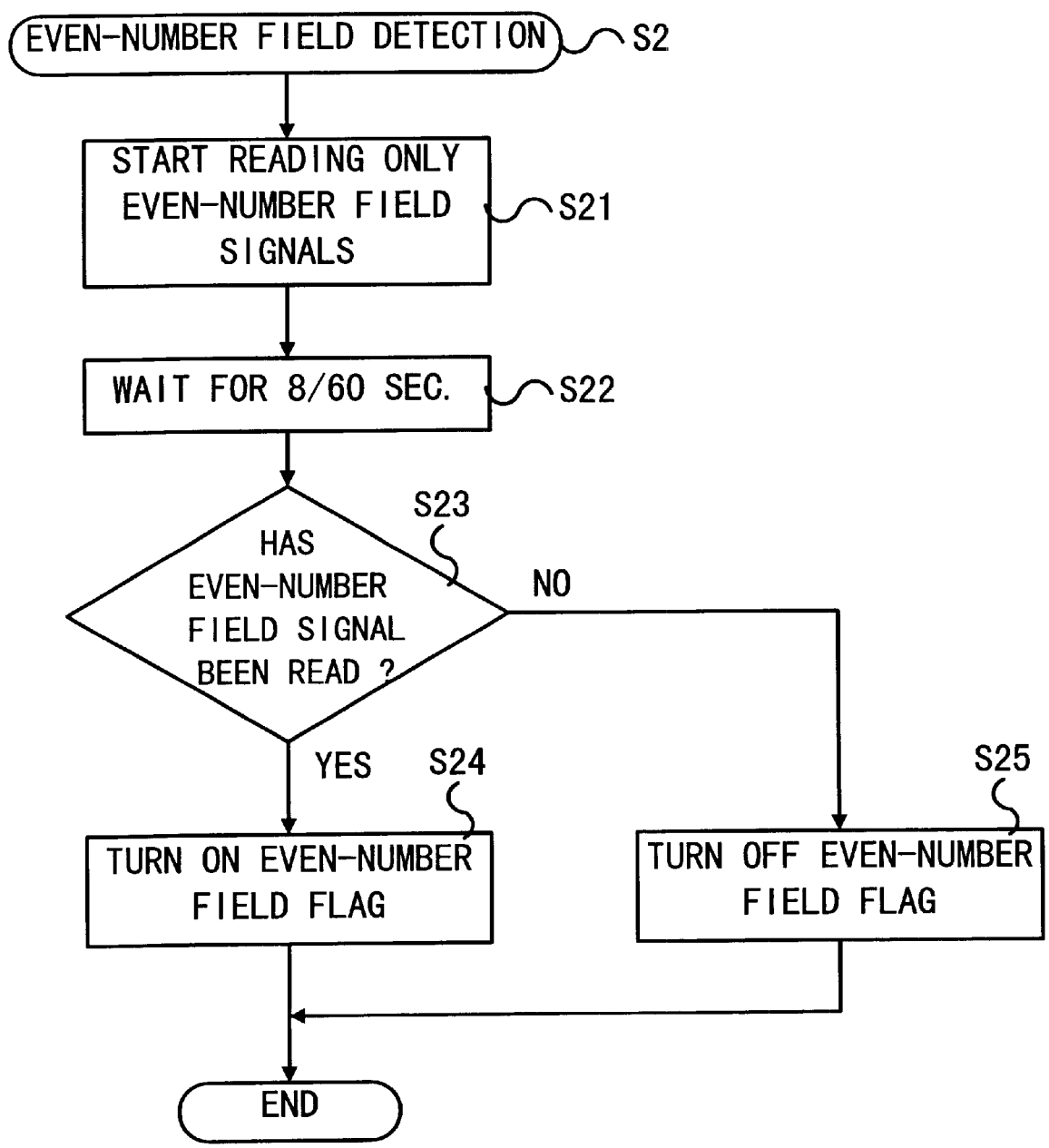
FIG. 5 is a flowchart of an even-number field detecting operation performed by the facsimile unit.

The CPU 11 controls the components connected by the facsimile control circuit 20, on the basis of various signals transmitted and received through the NCU 15, and thereby performs facsimile operations, and the like. The ROM 12 is a non-rewritable memory storing various control programs 12A that are executed in the multifunction peripheral apparatus 1. The programs illustrated in the flowcharts of FIGS. 3 through 5 are included in the control programs 12A stored in the ROM 12. The RAM 13 is a rewritable memory for storing various data. The RAM 13 contains an odd-number field memory 13A, an even-number field memory 13B, a frame memory 13C, an odd-number field flag 13D, an even-number field flag 13E, and other memories.

The odd-number field memory 13A stores odd-number field signals 31 among video signals (picture signals) received through the video signal input terminal 7. The even-number field memory 13B stores even-number field signals 32 among video signals received. The frame memory 13C stores video signals of a frame and the image data thereof. Based on the image data, the picture of the frame is printed by the ink jet printer 26. The frame memory 13C also stores the data from the odd-number field memory 13A or the even-number field memory 13B, obtained through conversion by non-interlace processing or linear complementary processing.

The odd-number field flag 13D indicates whether the video signals received include odd-number field signals 31. The odd-number field flag 13D is turned on when odd-number field signals 31 are detected in an odd-number field detecting operation S1 illustrated in FIG. 4. The odd-number field flag 13D is turned off if an odd-number field signal 31 is not detected. The even-number field flag 13E indicates whether the video signals received include even-number field signals 32. The even-number field flag 13E is turned on when even-number field signals 32 are detected in an even-number field detecting operation S2 illustrated in FIG. 5. The even-number field flag 13E is turned off if an even-number field signal 32 is not detected.

The EEPROM 14 is a rewritable, non-volatile memory, that is, data stored in the EEPROM 14 is retained even after the multifunction peripheral apparatus 1 is powered off. The NCU 15 performs various operation in conjunction with a telephone network (telephone line 52), such as transmission of dial signals, answering a ringing signal from the telephone line 52, and the like. The modem 16 modulates or demodulates image data for transmission to and reception from an external facsimile apparatus 51, and also transmits and receives various procedure signals for transmission control. The coder 17 codes document image data scanned by the scanner 19 and the like, and thereby compresses the data. The decoder 18 decodes coded data, such as received facsimile data. The scanner 19 reads an image from a document fed into the multifunction peripheral apparatus 1 from the document loading portion 4. The document sensor 8 is a sensor for detecting the presence of a document, that is, whether a document is placed on the document loading portion 4. The facsimile unit FU of the multifunction peripheral apparatus 1 is connected to the external facsimile apparatus 51 through the NCU 15 and the telephone line 52.

The printer unit PU includes: a CPU 21, that is, a processing unit; a ROM 22 storing control programs, and the like, to be executed by the CPU 21; a RAM 23 containing various memories that are referred to and updated at the time of execution of a program by the CPU 21, a print memory for storing print data, and the like; a personal computer interface 24 for connection to a personal computer (hereinafter, referred to as "PC") 53; a character generator (hereinafter, referred to as "CG") 25 storing vector fonts such as characters, and the like, for printing; and the ink jet printer 26 capable of full-color printing. These components are interconnected by a printer control circuit 27.

The PC interface 24 is, for example, a parallel interface according to the Centronics® standard. Through a cable 54 connected to the PC interface 24, the multifunction peripheral apparatus 1 is able to transmit data to and receive data from the PC 53.

Various operations performed in the multifunction peripheral apparatus 1 constructed as described above will be described with reference to the flowcharts of FIGS. 3 through 5. These operations are executed by the facsimile unit FU of the multifunction peripheral apparatus 1.

FIG. 3 shows a flowchart of an image printing operation. This operation is executed to print an image based on video signals input from a video camera, and the like, connected to the video signal input terminal 7.

In the image printing operation, the facsimile unit FU performs an odd-number field detecting operation in step S1, in which it is determined whether there is an odd-number field signal 31 among the video signals input. More specifically, in the odd-number field detecting operation in step S1, the CPU 11 of the facsimile unit FU starts reading only odd-number field signals 31 among the video signals being input, as shown in step S11 in FIG. 4. In step S12, the CPU 11 waits for $8/60$ second. After the waiting, the CPU 11 determines in step S13 whether an odd-number field signal 31 has been read. If an odd-number field signal 31 has been read (YES in step S13), the CPU 11 turns on the odd-number field flag 13D in step S14. Conversely, if an odd-number field signal 31 has not been read, the CPU 11 goes to step S15, where the odd-number field flag 13D is turned off. Then, the odd-number field detecting operation ends.

Odd-number field signals 31 are input in units of $2/60$ second (or in units of $1/60$ second if even-number field signals 32 are not input, but odd-number field signals 31 are input). Therefore, the signal-reading for an odd-number field signal 31 for 8/60 second, which is 4 times the input cycle of odd-number field signals 31 (8 times the cycle if even-number field signals 32 are not input) is sufficient to make a reliable determination. That is, if an odd-number field signal 31 is not detected for 8/60 second, it can be determined that the video signals being input are non-standard video signals that include no odd-number field signal.

After the odd-number field detecting operation in step S1, an even-number field detecting operation is performed in step S2. In the even-number field detecting operation, the CPU 11 starts reading only even-number field signals 32 among video signals being input, as shown in step S21 in FIG. 5. In step S22, the CPU 11 waits for 8/60 second. After the waiting, the CPU 11 determines in step S23 whether an even-number field signal 32 has been read. If an even-number field signal 32 has been read (YES in step S23), the CPU 11 turns on the even-number field flag 13E in step S24. Conversely, if an even-number field signal 32 has not been read, the CPU 11 goes to step S25, where the even-number field flag 13E is turned off. Then, the even-number field detecting operation ends.

Similar to the odd-number field signals, even-number field signals 32 are input in units of 2/60 second (or in units of 1/60 second if odd-number field signals 31 are not input, but even-number field signals 32 are input). Therefore, the signal-reading for an even-number field signal 32 for 8/60 second, which is 4 times the input cycle of even-number field signals 32 (8 times the cycle if odd-number field signals 31 are not input) is sufficient to make a reliable determination. That is, if an even-number field signal 32 is not detected for 8/60 second, it can be determined that the video signals being input are non-standard video signals that include no even-number field signal.

In addition, the space between each composite video signal existing in the last portion of the vertical synchronizing signal of the even-number field signal 32 is wider than that of the odd-number field signal 31. Therefore, the odd-number field signal 31 and the even-number field signal 32 can be distinguished based on this space. Thus, in the steps S11, S13, S21 and S23, we can distinguish between the odd-number field signal 31 and the even-number field signal 32 based on the space between the each composite video signal existing in the last portion of the vertical synchronizing signal. In the step S11, the odd-number field signal 31 is stored into the odd-number field memory 13A, and in the step S21, the even-number field signal 32 is stored into the even-number field memory 13B.

Figure 6:
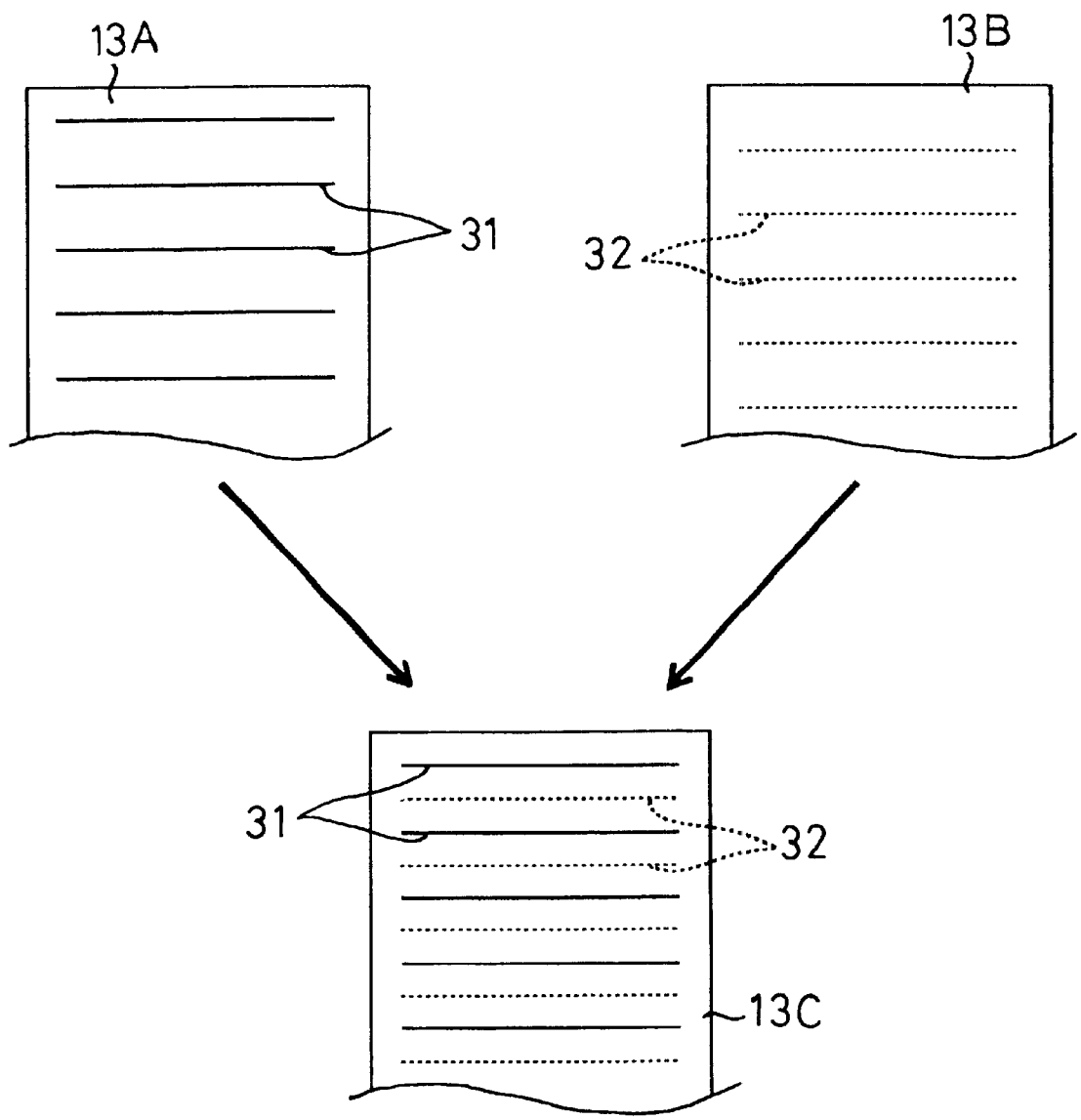
FIG. 6 is a diagram illustrating non-interlace processing performed in an image processing operation A.

In the image printing operation illustrated in FIG. 3, after the odd-number field detecting operation in step S1 and the even-number field detecting operation in step S2, the CPU 11 checks the status of the odd-number field flag 13D and the even-number number field flag 13E in steps S3, S4, and S7. If the odd-number field flag 13D and the even-number field flag 13E are both on (YES in step S3, and YES in step S4), the video signals input are standard video signals that include odd-number field signals 31 and even-number field signals 32. In this case, an image processing operation A is subsequently performed in step S5. In the image processing operation A, the CPU 11 performs non-interlace processing as shown in FIG. 6, in which the odd-number field signals 31 stored in the odd-number field memory 13A and the even-number field signals 32 stored in the even-number field memory 13B, are alternately written into the frame memory 13C corresponding to individual scanning lines. By the image processing operation A, image data of one frame is written into the frame memory 13C.

Figure 7:
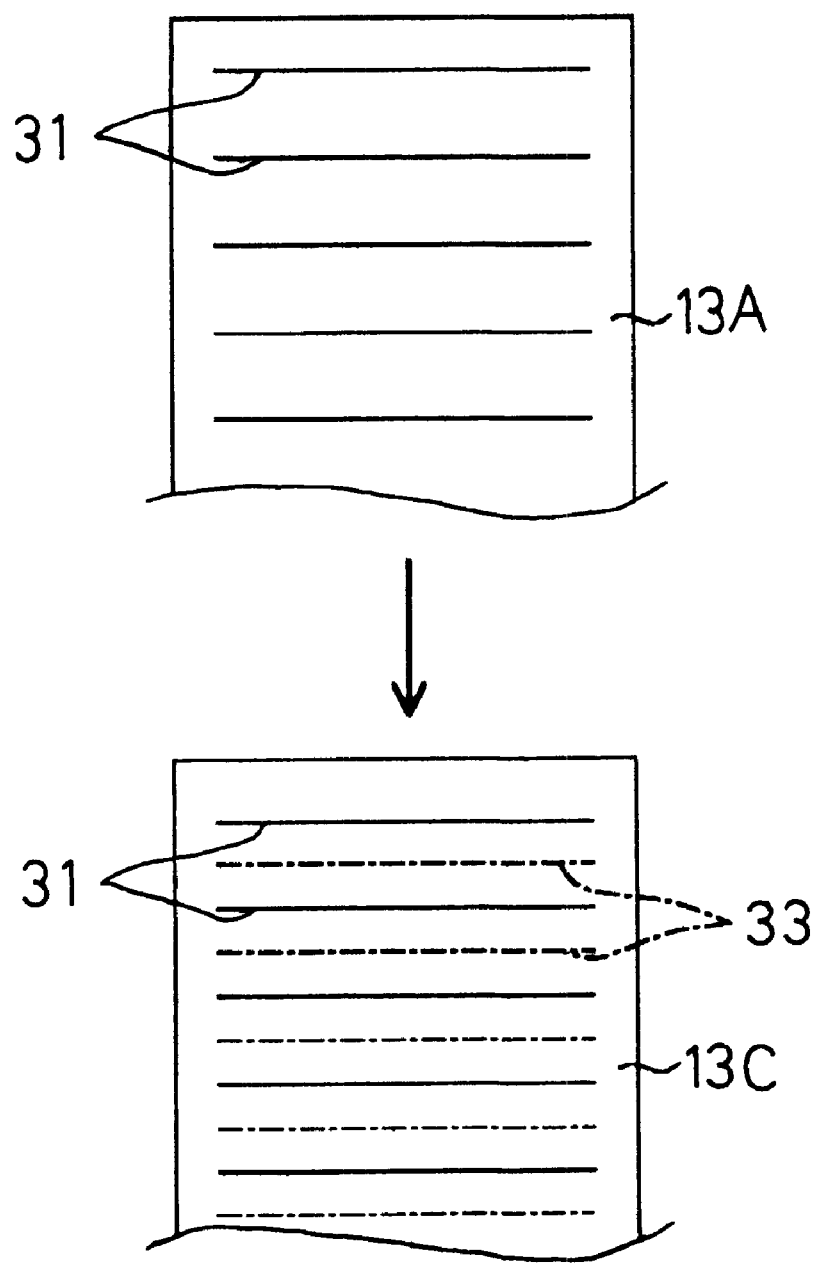
FIG. 7 is a diagram illustrating linear complementary processing performed in an image processing operation B.

If the odd-number field flag 13D is on and the even-number field flag 13E is off (YES in step S3, and NO in step S4), the video signals input are non-standard video signals that include odd-number field signals 31, but not even-number field signals 32. In this case, an image processing operation B is subsequently performed in step S6. In the image processing operation B, linear complementary processing as illustrated in FIG. 7, is performed. That is, image data of one frame is generated by alternately writing the odd-number field signals 31 stored in the odd-number field memory 13A and the odd-number complementary signals 33 prepared by linear complementary processing based on the odd-number field signals 31, into the frame memory 13C corresponding to the individual scanning lines. In the linear complementary processing, field signals of, for example, the second scanning line, are generated from the field signals of the first and third scanning lines, and field signals of the fourth line are generated from the field signals of the third and fifth scanning lines.

Figure 8:
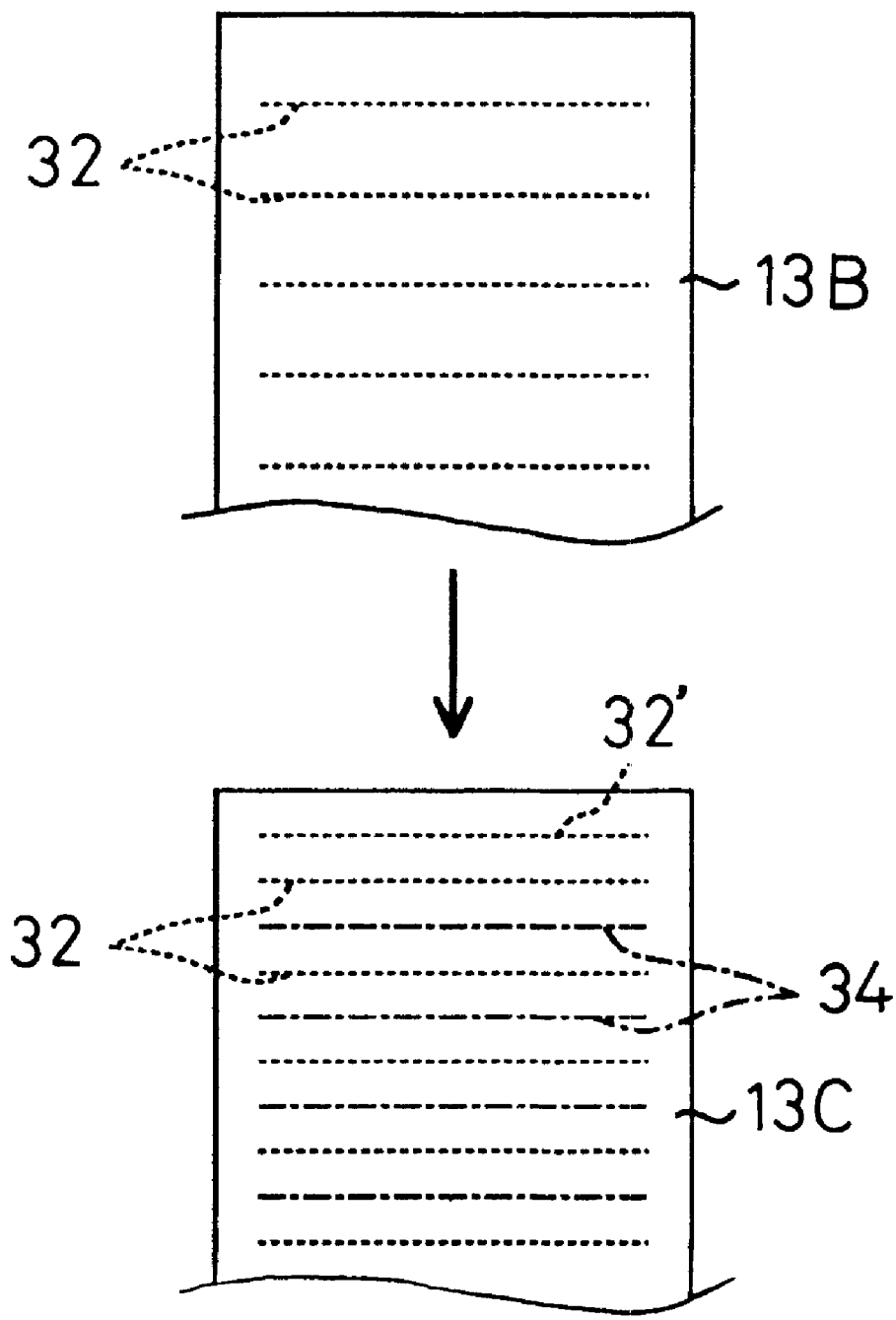
FIG. 8 is a diagram illustrating linear complementary processing performed in an image processing operation C.

If the odd-number field flag 13D is off and the even-number field flag 13E is on (NO in step S3, and YES in step S7), the video signals input are non-standard video signals that include even-number field signals 32, but not an odd-number field signal 31. In this case, an image processing operation C is subsequently performed in step S8. In the image processing operation C, linear complementary processing is performed as in the image processing operation B. That is, as illustrated in FIG. 8, image data of one frame is generated by alternately writing the even-number field signals 32 stored in the even-number field memory 13B and even-number complementary signals 34 prepared by linear complementary processing based on the even-number field signals 32, into the frame memory 13C corresponding to the individual scanning lines.

In the linear complementary processing, field signals of, for example, the third scanning line, are generated from the field signals of the second and fourth scanning lines, and field signals of the fifth scanning line are generated from the field signals of the fourth and sixth scanning lines. For the data of the first scanning line, the data of the second scanning line is directly used. Although not indicated in the drawings, different correction methods, such as the γ-correction, are employed by the image processing operation B in step S6 and the image processing operation C in step S8, to correct the image data when the signals of the odd and even-number field memories 13A, 13B are written into the frame memory 13C. For example, it is possible to perform γ-correction such that natural image color tones are achieved in the image processing operation B, and to perform γ-correction such that half-tones are not produced in the image processing operation C. More specifically, in the image processing operation B, it is desirable to perform γ-correction such that natural image color tones are achieved, since non-standard video signals that include odd-number field signals, but not even-number field signals, are normally from video decks for still-picture reproduction or from some types of video cameras, and the image based on such signals, needs to be smooth. In the image processing operation C, it is desirable to perform γ-correction because half-tones are not produced, since non-standard video signals that include even-number field signals, but not odd-number field signals, are normally from game machines and do not carry much information for image half-tones.

After the image processing operation A, B or C in step S5, S6 or S8, a printing operation based on the single-frame image data stored in the frame memory 13C is performed using the ink jet printer 26 in step S9 and the image printing operation ends. If both the odd-number field flag 13D and the even-number field flag 13E are off (NO in step S3, and NO in step S4), no video signal is input, so that the CPU 11 displays on the LCD 6 a caution message indicating that no video signal has been received, such as "NO PICTURE RECEIVED. CHECK CONNECTION TO OUTPUT DEVICE." or the like, in step S10. Subsequently, the CPU 11 ends the image printing operation without printing. In this manner, this embodiment advises a user of such a failure and prevents an unnecessary or useless printing operation.

As understood from the foregoing description, the image printing operation according to this embodiment includes three different-mode image processing operations A, B and C for conversion of video signals into image data, and selectively uses an appropriate one of the image processing operations A, B and C in accordance with video signals input. Therefore, this embodiment eliminates the need for a user to perform a troublesome switching operation to select an appropriate one of the image processing operations A, B and C, and therefore makes image printing an easy operation. Furthermore, this embodiment ensures that the input video signals will be converted into image data in an appropriate mode, and therefore enables picture printing with good quality.

The foregoing embodiment may be modified in various manners, as follows. For example, although the foregoing embodiment performs non-interlace processing in the image processing operation A, and linear complementary processing in the image processing operations B and C, it is also possible to employ other processing techniques instead. In the case of video signals made up of odd-number field signals, instead of linear complementary processing, it is possible to perform enlarging processing wherein raster scan data of the first scanning line may be supplementally added to the raster scan data of the second scanning line. In the case of video signals made up of even-number field signals, instead of linear complementary processing, it is possible to perform enlarging processing wherein raster scan data of the second scanning line may be supplementally added to the raster scan data of the third scanning line.

The foregoing embodiment performs the image processing operation B when only odd-number field signals 31 are input, and performs image processing operation C, different from the image processing operation B, when only even-number field signals 32 are input. However, the same image processing operation may be performed both in the case where only even-number field signals 32 are input and in the case where only even-number field signals 32 are input. That is, the image processing operations B and C in the foregoing embodiment may be the same operation.

It is to be understood that the invention is not restricted to the particular forms shown in the foregoing embodiment. Various other modifications and alterations can be made thereto without departing from the spirit of the invention.

What is claimed is:

1. A picture signal processing apparatus comprising:
   reception means for receiving a picture signal;
   image conversion means for converting the picture signal received by the reception means into image data using a selected mode of conversion;
   odd-number field determining means for directly determining whether there is an odd-number field signal in the picture signal received by the reception means;
   even-number field determining means for directly determining whether there is an even-number field signal in the picture signal received by the reception means; and
   conversion mode changing means for automatically determining the selected mode of conversion to be used by the image conversion means based on the determinations made by the odd-number field determining means and the even-number field determining means,
   wherein the odd-number field determining means and the even-number field determining means determines the presence of the odd-number field signal and the even-number field signal in the picture signal based on a waiting of a predetermined period of time which comprises an integer number of times of input cycle of one of the odd-number field signal and the even-number field signal.

2. The picture signal processing apparatus according to claim 1, wherein the conversion mode changing means sets the mode of conversion to non-interlace processing, based on determinations that there are both an odd-number field signal and an even-number field signal in the picture signal, by the odd-number field determining means and the even-number field determining means.

3. The picture signal processing apparatus according to claim 2, wherein the conversion mode changing means sets the mode of conversion to linear complementary processing, based on a determination that there is one of an odd-number field signal and an even-number field signal in the picture signal, by the odd-number field determining means and the even-number field determining means.

4. The picture signal processing apparatus according to claim 3, further comprising:
   printing means for printing an image based on the image data obtained through the conversion by the conversion means according to a print instruction; and
   print preventing means for preventing the printing means from printing by ignoring printing instruction based on a determination that there is neither an odd-number field signal nor an even-number field signal in the picture signal, by the odd-number field determining means and the even-number field determining means.

5. The picture signal processing apparatus according to claim 4, further comprising indication means for indicating that there is neither an odd-number field signal nor an even-number field signal in the picture signal, based on determinations by the odd-number field determining means and the even-number field determining means.

6. The picture signal processing apparatus according to claim 4, wherein the picture signal received by the reception means is a video signal.

7. The picture signal processing apparatus according to claim 3, wherein if it is determined by the odd-number field determining means and the even-number field determining means that there is one of an odd-number field signal and an even-number field signal in the picture signal, the conversion mode changing means selects a mode of linear complementary processing in a case where there is an odd-number field signal but not an even-number field signal, and selects another mode of linear complementary processing in the case where there is an even-number field signal but not an odd-number field signal.

8. A picture signal processing apparatus comprising:
   a receiver unit that receives a picture signal;
   an image converter unit that converts the picture signal received by the receiver unit into image data using a selected mode of conversion;
   an odd-number field determining unit that directly determines whether there is an odd-number field signal in the picture signal received by the receiver unit;

an even-number field determining unit that directly determines whether there is an even-number field signal in the picture signal received by the receiver unit; and a conversion mode changer unit that automatically determines the selected mode of conversion to be used by the image converter unit based upon the determinations made by the odd-number field determining unit and the even-number field determining unit, wherein the odd-number field determining unit and the even-number field determining unit determines the presence of the odd-number field signal and the even-number field signal in the picture signal based on a waiting of a predetermined period of time which comprises an integer number of times of input cycle of one of the odd-number field signal and the even-number field signal.

9. The picture signal processing apparatus according to claim 8, wherein the conversion mode changer unit sets the mode of conversion to non-interlace processing, based on a determination that there are both an odd-number field signal and an even-number field signal in the picture signal, by the odd-number field determining unit and the even-number field determining unit.

10. The picture signal processing apparatus according to claim 8, wherein the conversion mode changer unit sets the mode of conversion to linear complementary processing, based on a determination that there is one of an odd-number field signal and an even-number field signal in the picture signal, by the odd-number field determining unit and the even-number field determining unit.

11. The picture signal processing apparatus according to claim 8, further comprising an indicator unit that indicates that there is neither an odd-number field signal nor an even-number field signal in the picture signal, based on determinations by the odd-number field determining unit and the even-number field determining unit.

12. The picture signal processing apparatus according to claim 8, further comprising:

a printer unit that prints an image based on the image data obtained through the conversion by the converter unit according to a print instruction; and a print preventing unit that prevents the printer unit from printing by ignoring printing instruction if it is determined that there is neither an odd-number field signal nor an even-number field signal in the picture signal, by the odd-number field determining unit and the even-number field determining unit.

13. The picture signal processing apparatus according to claim 12, wherein the printer unit is an ink jet printer.

14. The picture signal processing apparatus according to claim 8, wherein the picture signal received by the receiver unit is a video signal.

15. The picture signal processing apparatus according to claim 8, further comprising an odd-number field memory that stores the odd-number field signal in the picture signal received by the receiver unit, and an even-number field memory that stores the even-number field signal in the picture signal received by the receiver unit.

16. The picture signal processing apparatus according to claim 8, further comprising a frame memory that stores the image data obtained through conversion by the converter unit.

17. A picture signal processing method comprising:
receiving a picture signal;
converting the picture signal received in the receiving step into image data using a selected mode of selection;

determining directly whether there is an odd-number field signal in the picture signal received in the receiving step;

determining directly whether there is an even-number field signal in the picture signal received by the receiving step; and determining automatically the selected mode of conversion to be used in the converting step based upon determinations made in the odd-number field determining step and the even-number field determining step, wherein the odd-number field determining step and the even-number field determining step determines the presence of the odd-number field signal and the even-number field signal in the picture signal based on a waiting of a predetermined period of time which comprises an integer number of times of input cycle of one of the odd-number field signal and the even-number field signal.

18. The picture signal processing method according to claim 17, wherein the changing the mode of conversion step changes the mode of conversion to non-interlace processing, based on a determination that there are both the odd-number field signal and the even-number field signal in the picture signal, by the odd-number field determining step and the even-number field determining step.

19. The picture signal processing method according to claim 17, wherein the changing the mode of conversion step changes the mode of conversion to linear complementary processing, based on a determination that there is one of an odd-number field signal and an even-number field signal in the picture signal, by the odd-number field determining step and the even-number field determining step.

20. The picture signal processing method according to claim 17, further comprising indicating that there is neither an odd-number field signal nor an even-number field signal in the picture signal, based on a determination by the odd-number field determining step and the even-number field determining step.

21. The picture signal processing method according to claim 17, further comprising:

printing an image based on the image data obtained through the conversion by the converting according to a printing instruction; and preventing the printing from being executed by ignoring printing instruction based on a determination by the determinings that there is neither an odd-number field signal nor an even-number field signal in the picture signal.

22. A picture signal processing apparatus capable of being connected with various kinds of external picture signal output devices, comprising:

connecting means for connecting an external picture signal output device with the picture signal processing apparatus;

reception means for receiving a picture signal from the external picture signal output device via the connecting means;

image conversion means for converting the picture signal received by the reception means into image data using a selected mode of conversion;

odd-number field determining means for directly determining whether there is an odd-number field signal in the picture signal received by the reception means;

even-number field determining means for directly determining whether there is an even-number field signal in the picture signal received by the reception means; and conversion mode changing means for automatically determining the selected mode of conversion to be used by the image conversion means based on the picture signal input from the external picture signal output device via the connecting means, wherein the odd-number field determining means and the even-number field determining means determines the presence of the odd-number field signal and the even-number field signal in the picture signal based on a waiting of a predetermined period of time, and wherein the predetermined period of time comprises an integer number of times of input cycle of one of the odd-number field signal and the even-number field signal.

* * * * *